United States Patent Office 3,481,900
Patented Dec. 2, 1969

3,481,900
USE OF SELECTED 4,4′-METHYLENEBIS (2,6-DI-ALKYLANILINES) AS CURING AGENTS FOR EPOXY RESINS
Norman K. Sundholm, Middlebury, Conn., assignor to Uniroyal, Inc., New York, N.Y., a corporation of New Jersey
No Drawing. Filed Mar. 28, 1967, Ser. No. 626,410
Int. Cl. C08g 23/12
U.S. Cl. 260—47                4 Claims

ABSTRACT OF THE DISCLOSURE

Epoxy resins are cured with 4,4′-methylenebis(2,6-dialkylanilines) having the structural formula:

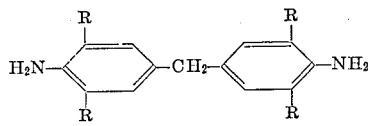

where the alkyl group is an ethyl group or a secondary alkyl group having from 3 to 6 carbon atoms.

BACKGROUND OF THE INVENTION

This invention relates to a novel process for curing epoxy resins and to epoxy resin-curing agent blends. More particularly, the invention relates to the use of epoxy resin curing agents which readily blend with liquid resins because the curing agents are liquids, or solids which readily dissolve in the resins at processing temperatures. The curing agents have longer pot lives after blending into the resin than the commonly used 4,4′-methylenedianiline and meta-phenylenediamine.

Until epoxy resins are cured they have no useful structural property. After cure they become tough, hard, infusible and resistant to structural distortion at elevated temperatures.

The epoxy resins may be polymeric or monomeric and are mixtures of molecules containing the epoxy group

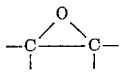

which serves as a point for chain extension and cross-linking. On the average more than one epoxy group is present per molecule. The concentration of epoxy groups is generally denoted by the term "epoxide equivalent," which is the number of grams of resin containing one gram equivalent of epoxide.

A description of the synthesis, characterization, curing and application of epoxy resins is presented in the test Epoxy Resins by H. Lee and K. Neville, McGraw-Hill Book Company, Inc., 1957. Most of the commercial resins are the epoxy ethers formed by the reaction of epichlorohydrin with a polyhydric phenol or a polyalcohol in the presence of an agent, such as sodium hydroxide. The polyhydric phenol used to the greatest extent is 2,2-bis(4-hydroxyphenyl)propane, commonly known as bisphenol A. However, the resin need not be an epoxy ether but may be a polyepoxide formed by the epoxidation of a polyene, such as dicyclopentadiene and 4-vinylcyclohexene, a homopolymerized diene, such as polybutadiene, a glyceride of an unsaturated fatty acid, such as soybean oil, etc.

Epoxies may be cured in two ways: catalysis or copolymerization. In catalytic curing, the epoxy molecules react directly with each other in a reaction started by a catalyst; such systems are said to be homopolymerized.

Copolymerized epoxies have hardeners mixed into the resins. These hardeners contain reactive groups which unite with the epoxy groups and become a vital part of the cured material. Epoxy resin-hardener systems are said to be heteropolymerized.

A variety of chemical compounds act as curing agents for epoxy resins. The two major classes are the organic amines and various derivatives thereof, and organic dibasic and polybasic acids and acid anhydrides. Examples of the amine class are 4,4′-methylenedianiline, meta-phenylenediamine, 4,4′-diaminodiphenyl sulfone, diethylenetriamine, diethylaminopropylamine, piperidine, triethylamine, benzyldimethylamine, 2,4,6 - tris(dimethylaminomethyl)phenol and its tri-2-ethylhexoate salt, dicyandiamide, boron trifluoride-monoethylamine complex, and triethanolamine borate. Examples of the acid and anhydride class are oxalic acid, phthalic anhydride, hexahydrophthalic anhydride, dodecenyl succinic anhydride and pyromellitic dianhydride.

In commercial practice the curing agent is usually mixed as a liquid with the liquid epoxy resin, the resin being heated if necessary. It is advantageous if the curing agent is a liquid or low-melting solid. This facilitates the blending operation. It is also advantageous for the resin blend containing the curing agent to have a long pot life so that, if it is added to an epoxy resin which requires heating to make it sufficiently liquid for easy blending, cure does not occur during the blending and application (casting, coating, laminating, molding, etc.) operations. The blending of the curing agent and epoxy resin should also be characterized by having a low exotherm, so that the heat generated from the curing reaction in large batches does not become excessive and uncontrollable.

It is an object of the present invention to provide improved curing agents.

It is a further object of this invention to provide epoxy resin curing agents which are readily blended into a liquid epoxy resin mix.

It is a further object of this invention to provide mixtures of epoxy resins and curing compounds which have long pot lives.

It is a still further object of this invention to provide an improved method of curing epoxy resin.

Other objects, features and advantages of the invention will be apparent from the following description of the invention.

SUMMARY OF THE INVENTION AND DESCRIPTION OF PREFERRED EMBODIMENTS

The organic compounds which are readily blended with epoxy resins, afford long pot lives and give the epoxy resins cured with them good resistance to heat distortion are 4,4′-methylenebis(2,6-dialkylanilines). Such compounds have the structural formula:

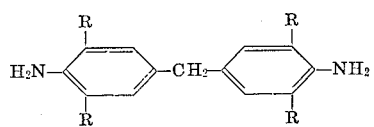

where R is an ethyl group or a secondary alkyl group having 3 to 6 carbon atoms. The preferred groups are ethyl, isopropyl, sec-butyl, and 2-hexyl.

The compounds may be synthesized by the condensation of the corresponding 2,6-disubstituted anilines with formaldehyde in the presence of dilute mineral acid using greater than a 2 to 1 molar ratio of 2,6-disubstituted aniline to formaldehyde. The 2,6-disubstituted anilines, if not available, may be prepared by the alkylation of aniline with the appropriate olefin in the presence of aluminum and aluminum chloride using the procedure described by Stroh, Ebersberger, Haberland and Hahn on page 240 of the text Newer Methods of Preparative Organic Chemistry, edited by W. Foerst, Academic Press, 1963.

It is a feature of the present invention that all of the homologues are either liquids or solids which melt below the 93° C. melting point of the commonly used pure 4,4'-methylenedianiline. The tetraethyl compound melts at 92° C. The tetraisopropyl compound melts at 66–67° C., and the tetra-sec-butyl and tetra-2-hexyl compounds are liquid at room temperature. The compounds of this invention, therefore, are distinquishable in this regard from the tetramethyl compound [4,4'-methylenebis (2,6-dimethylaniline)], which melts at 124–126° C. when pure. All of the homologues of this invention are readily soluble in epoxy resins at the usual processing temperatures.

It is another feature of the present invention that the epoxy resin blends made with the aromatic diamine compounds of the present invention have longer pot lives than those of blends made with the commonly used 4,4'-methylenedianiline and meta-phenylenediamine.

Specific examples of the practice of the invention are given below in order to disclose more clearly the nature of the invention. It should be understood, however, that this is done solely by way of example and is intended neither to delineate the scope of the invention nor limit the ambit of the appended claims.

EXAMPLE I

Preparation of 4,4'-methylenebis (2,6-diisopropylaniline)

To a stirred solution of 141.6 grams (0.80 mole) of 2,6-diisopropylaniline, 66.7 ml. of concentrated hydrochloric acid, 750 ml. of water and 300 ml. of ethanol at 60° C. were added 24.3 grams (0.30 mole) of 37% formaldehyde during ½ hour. The solution was heated at 60° C. for 3 hours and then 300 ml. of water and 55 grams of 28–30% aqueous ammonia were added. The resulting oil was separated, dried with solid potassium hydroxide and distilled. The fraction boiling at 215–218° C. (0.5 mm.) was collected; it consisted of 96 grams of yellow oil which slowly solidified at room temperature. It was recrystallized from ethanol to give 14 grams of colorless crystals melting at 66–67° C.

Analysis.—Calculated for $C_{25}H_{38}N_2$: C, 81.97; H, 10.38; N, 7.65. Found: C, 82.29; H, 10.56; N, 7.69.

EXAMPLE II

Preparation of 4,4'-methylenebis (2,6-di-sec-butylaniline)

The 2,6-di-sec-butylaniline was prepared from aniline and 1-butene by the procedure given in the Stroh, et al. reference cited above. It was obtained as an oil boiling at 79–83° C. (0.4 mm.).

The procedure for the preparation of the diamine was the same as that of the above example using 164 grams (0.80 mole) of 2,6-di-sec-butylaniline, 66.7 ml. of concentrated hydrochloric acid, 750 ml. of water, 250 ml. of ethanol and 24.3 grams (0.30 mole) of 37% formaldehyde. The compound obtained boiled at 196–198° C. (0.3 mm.) and consisted of 93 grams of pale yellow oil.

Analysis.—Calculated for $C_{29}H_{46}N_2$: C, 82.47; H, 10.90; N, 6.64. Found: C, 82.31; H, 11.23; N, 6.81.

EXAMPLE III

Preparation of 4,4'-methylenebis [2,6-di(2-hexyl)aniline]

The 2,6-di(2-hexyl)aniline was prepared from aniline and 1-hexene by the procedure given in the Stroh, et al. reference cited above. It was obtained as an oil boiling at 108–110° C. (0.2 mm.).

The procedure for the preparation of the diamine was the same as that of Example I using 88.7 grams (0.34 mole) of 2,6-di(2-hexyl) aniline, 28.3 ml. of concentrated hydrochloric acid, 300 ml. of water, 350 ml. of ethanol and 10.3 grams (0.128 mole) of 37% formaldehyde. The compound obtained boiled at 213–215° C. (0.2 mm.) and consisted of 47 grams of light tan oil.

Analysis.—Calculated for $C_{37}H_{62}N_2$: C, 83.15; H, 11.61; N, 5.24. Found: C, 82.70; H, 11.84; N, 5.22.

EXAMPLE IV

The compounds of Examples I–III, 4,4'-methylenebis (2,6-diethylaniline) and two commonly used curing agents were tested as curing agents for epoxy resins using two typical commercial resins, and an experimental resin. One commercial resin was Epon 828 derived from epichlorohydrin and bisphenol A, having an epoxide equivalent of 188 and an approximate average molecular weight of 380.

The equivalent weights of the new curing agents, the weight in grams that reacts stoichiometrically with 188 grams of Epon 828, were calculated by dividing their molecular weights by 4 since each of the 4 hydrogen atoms attached to the nitrogen atoms can react with one epoxy group. Calculations were made for the weight of curing agent and epoxy resin required to give a mixture weighing about 40 grams. For example, 12.4 grams of 4,4'-methylenebis (2,6-diethylaniline) and 30 grams of Epon 828 were used.

The weighted quantity of resin heated to 80° C. was added to the weighed quantity of curing agent heated to 80° C. or to the melting point of the curing agent if it melts above 80° C. The mixture was blended, centrifuged to deaerate it and poured into a mold having inside dimensions 7 x ½ x ½ inches. The resin-curing agent blends were cured by heating at 85° C. for 2 hours, followed by 150° C. for 16 hours. The cured bars were removed and tested for heat-distortion temperature using the procedure of ASTM D648–56. The results are given in Table I.

The same test was run using an experimental resin having an epoxide equivalent of 263, and prepared from epichlorohydrin and bisphenol A according to the procedure of Example I of U.S. Patent 2,651,589.

The same test was repeated using D.E.N. 431 an epoxy novolac resin having an epoxide equivalent of 175. The results are given in Table I.

The pot life of each of the new curing agents was determined in Epon 828. Ten grams of resin at 100° C. were added to the equivalent amount of curing agent at 100° C. After mixing, the blends were placed in an oven at 100° C. and the time required for them to become unpourable was determined. The results are given in Table I.

The pot lives of the curing agents of the invention are much longer than those of 4,4'-methylenedianiline and meta-phenylenediamine, which, under the conditions described, were 25 and 14 minutes, respectively. The peak exothermic values for 4,4'-methylenedianiline and meta-phenylenediamine in the pot life test were also markedly higher, 127° C. and 146° C., respectively, compared to 102° C. for 4,4'-methylenebis(2,6-diethylaniline). 4,4' - methylenebis[2,6 - di(2-hexyl)aniline] showed no exotherm in this test. The properties, for which data are presented in Table I, permit the use of longer working times and larger batches of the resin-curing agent mixtures in the case of the new curing agents.

TABLE I

| Diamine | Heat-distortion Temperature, °C. | | | Pot life, min. | Melting Point, °C. |
|---|---|---|---|---|---|
| | In Epon 828 | In exptl. resin | In D.E.N. 431 | | |
| 4,4'-methylenedianiline | 165 | 129 | 134 | 25 | 93 |
| meta-Phenylenediamine | 167 | | 157 | 14 | 63 |
| 4,4'-methylenebis(2,6-dimethylaniline) | 178 | | 165 | 140 | 124-126 |
| 4,4'-methylenebis(2,6-diethylaniline) | 157 | 122 | 153 | 280 | 92 |
| 4,4'-methylenebis(2,6-diisopropylaniline) | 163 | 123 | 156 | 280 | 66-67 |
| 4,4'-methylenebis(2,6-di-sec-butylaniline) | 143 | 109 | | 360 | (1) |
| 4,4'-methylenebis[2,6-di(2-hexyl)aniline] | 109 | | | 660 | (1) |

1 These compounds are liquid at room temperature, 20-25° C.

The 4,4'-methylenebis(2,6-dimethylaniline) is not desirable because of its high melting point.

It is to be understood that various compounding ingredients, other than the curing agent, may be blended with the epoxy resin. These other ingredients include diluents, fillers, resinous modifiers, plasticizers and flexibilizers. The curing temperature is in the range of about 60-200° C.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

Having thus described my invention, what I claim and desire to protect by Letters Patent is:

1. A curable epoxy resin composition comprising an epoxy resin containing, on the average, more than one 1,2-epoxide group per molecule and a 4,4'-methylenebis-(2,6-dialkylaniline) where the alkyl group is an ethyl group or a secondary alkyl group having from 3 to 6 carbon atoms.

2. A composition as defined in claim 1 where the alkyl group is at least one member selected from the class consisting of ethyl, isopropyl, sec-butyl and 2-hexyl groups.

3. A cured epoxy resin composition prepared by the steps of:

(A) Mixing at least one epoxy resin containing, on the average, more than one 1,2-epoxide group per molecule and a curing agent having the structural formula:

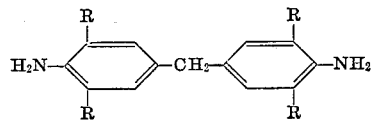

where R is an ethyl group or a secondary alkyl group having from 3 to 6 carbon atoms; and (B) Heating the mixture at curing temperatures until cured.

4. A composition as defined in claim 3 where R is at least one member selected from the class consisting of ethyl, isopropyl, sec-butyl and 2-hexyl groups.

References Cited

UNITED STATES PATENTS 2,891,927   6/1959   Philipson.

HAROLD D. ANDERSON, Primary Examiner

T. PERTILLA, Assistant Examiner

U.S. Cl. X.R.

260—2, 59